United States Patent
Schmidt et al.

(10) Patent No.: US 9,916,580 B2
(45) Date of Patent: Mar. 13, 2018

(54) PAYMENT DEVICE WITH HOLOGRAPHIC SECURITY ELEMENT

(71) Applicant: Visa International Service Association, San Francisco, CA (US)

(72) Inventors: Julian Schmidt, Orinda, CA (US); Dori K. Skelding, Dublin, CA (US); Kenneth Sippola, San Francisco, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 330 days.

(21) Appl. No.: 14/678,441

(22) Filed: Apr. 3, 2015

(65) Prior Publication Data

US 2015/0287027 A1    Oct. 8, 2015

Related U.S. Application Data

(60) Provisional application No. 61/975,106, filed on Apr. 4, 2014.

(51) Int. Cl.
| | |
|---|---|
| *G06K 5/00* | (2006.01) |
| *G06Q 20/38* | (2012.01) |
| *G06Q 20/34* | (2012.01) |
| *G07F 7/08* | (2006.01) |
| *G03H 1/00* | (2006.01) |
| *G06K 19/16* | (2006.01) |

(52) U.S. Cl.
CPC ......... *G06Q 20/382* (2013.01); *G03H 1/0011* (2013.01); *G06K 19/16* (2013.01); *G06Q 20/34* (2013.01); *G07F 7/0813* (2013.01)

(58) Field of Classification Search
CPC .......... G07F 7/1008; G07F 7/08; G06Q 20/40
USPC ................................... 235/380, 383
See application file for complete search history.

(56) References Cited

U.S. PATENT DOCUMENTS

| | | |
|---|---|---|
| 6,049,055 A | 4/2000 | Fannash et al. |
| 6,170,880 B1 | 1/2001 | Prancz |
| 6,193,163 B1 | 2/2001 | Fehrman et al. |
| 6,371,378 B1 | 4/2002 | Brunet et al. |
| 8,079,519 B2 | 12/2011 | Pepori et al. |

(Continued)

FOREIGN PATENT DOCUMENTS

| | | |
|---|---|---|
| DE | 19530608 A1 | 2/1997 |
| DE | 19626702 C1 | 12/1997 |

(Continued)

OTHER PUBLICATIONS

International Search Report and Written Opinion, issued in connection with corresponding application PCT/US/24332, dated Jul. 20, 2015 (7 pages).

(Continued)

*Primary Examiner* — Ahshik Kim
(74) *Attorney, Agent, or Firm* — Loeb & Loeb LLP

(57) ABSTRACT

An object that enables electronic commerce is disclosed where the object has a holographic image on security contacts. The security contacts may be in communication with a security element that provides security features. The contacts may be placed in predetermined locations but may be extended to create a complementary identifiable image.

20 Claims, 14 Drawing Sheets

(56) References Cited

U.S. PATENT DOCUMENTS

| | | | |
|---|---|---|---|
| 2010/0025475 A1* | 2/2010 | Webb .................... B41M 3/14 |
| | | | 235/488 |
| 2011/0163167 A1 | 7/2011 | Artigue et al. | |
| 2014/0097253 A1* | 4/2014 | Benato ............. G06K 19/07749 |
| | | | 235/488 |
| 2015/0178616 A1* | 6/2015 | Blum ............... G06K 19/07749 |
| | | | 235/488 |
| 2015/0269465 A1* | 9/2015 | Zimmerman ........ G06K 19/042 |
| | | | 235/488 |

FOREIGN PATENT DOCUMENTS

| | | |
|---|---|---|
| EP | 2690584 A1 | 1/2014 |
| GB | 2331727 A | 6/1999 |
| WO | 00/33142 A1 | 6/2000 |

OTHER PUBLICATIONS

European Patent Office, "Extended European Search Report," issued for application No. EP15773543 dated Oct. 9, 2017, 9 pages.

* cited by examiner

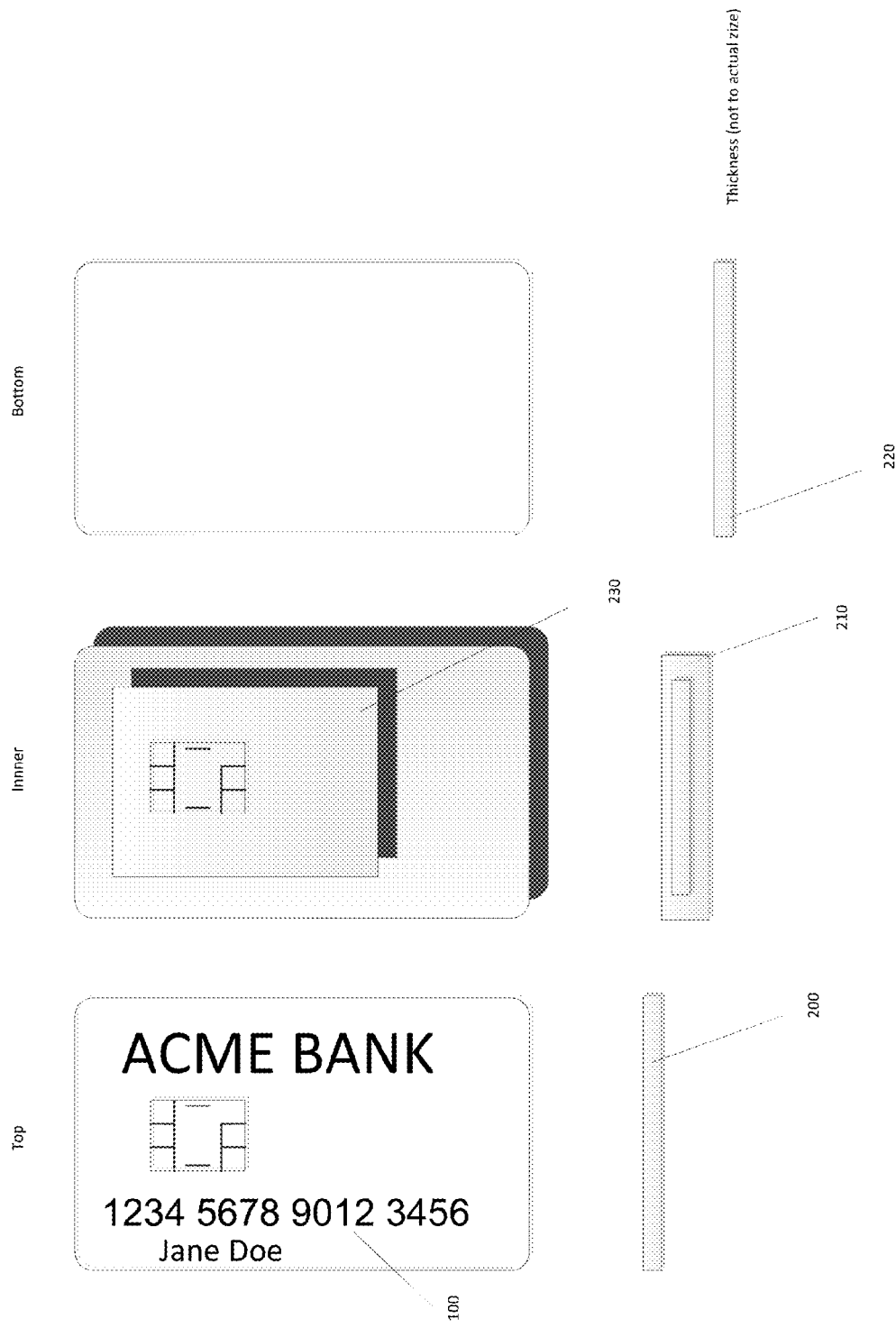

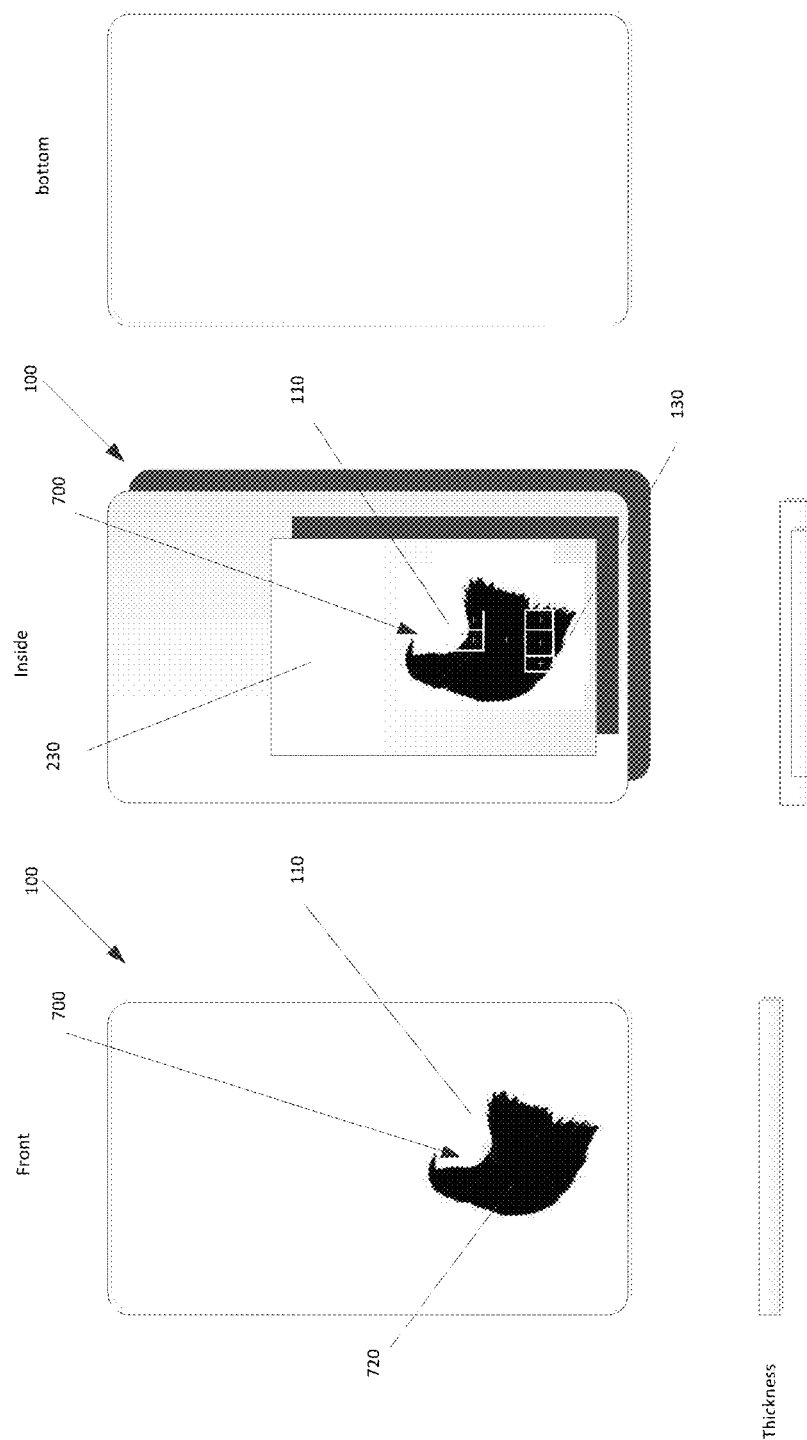

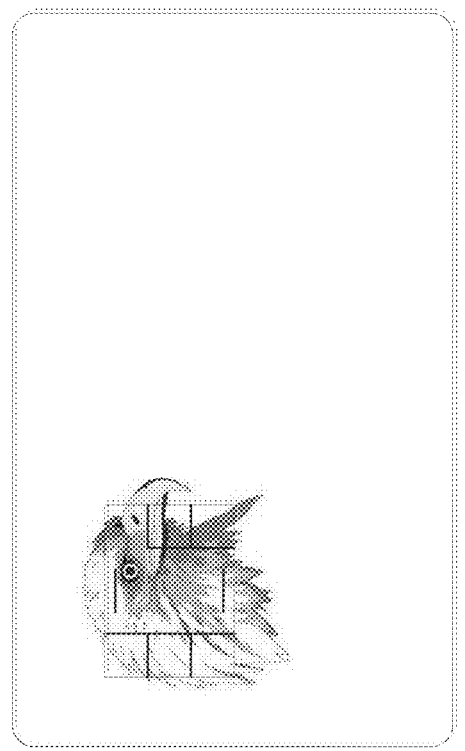
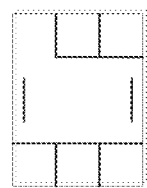
130
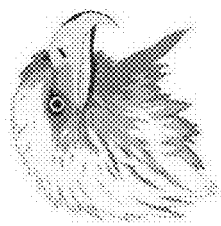
900
Fig. 8

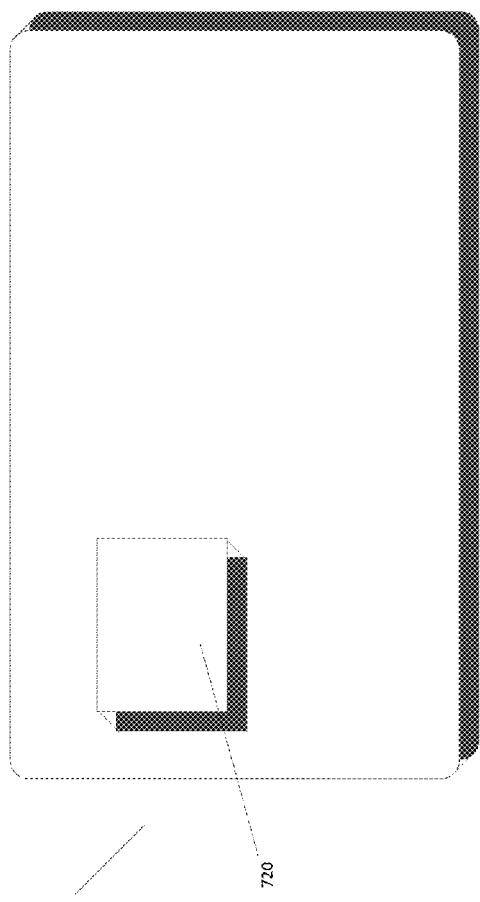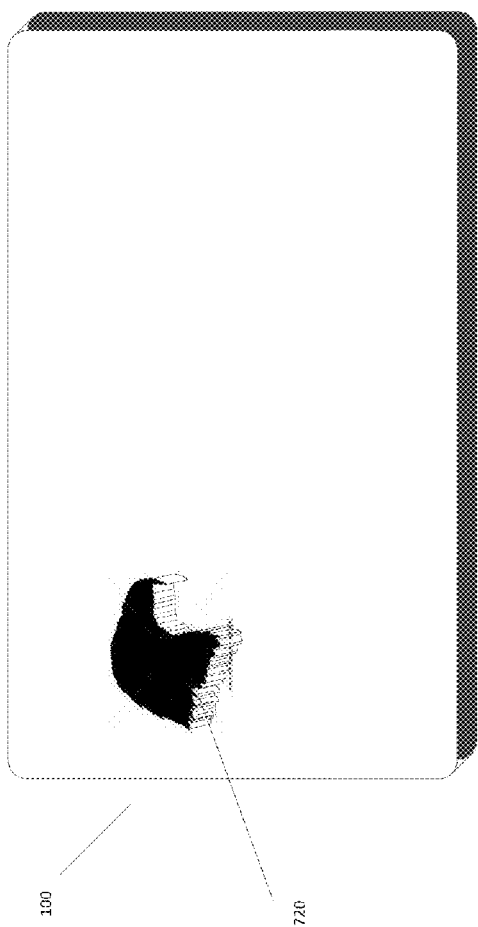

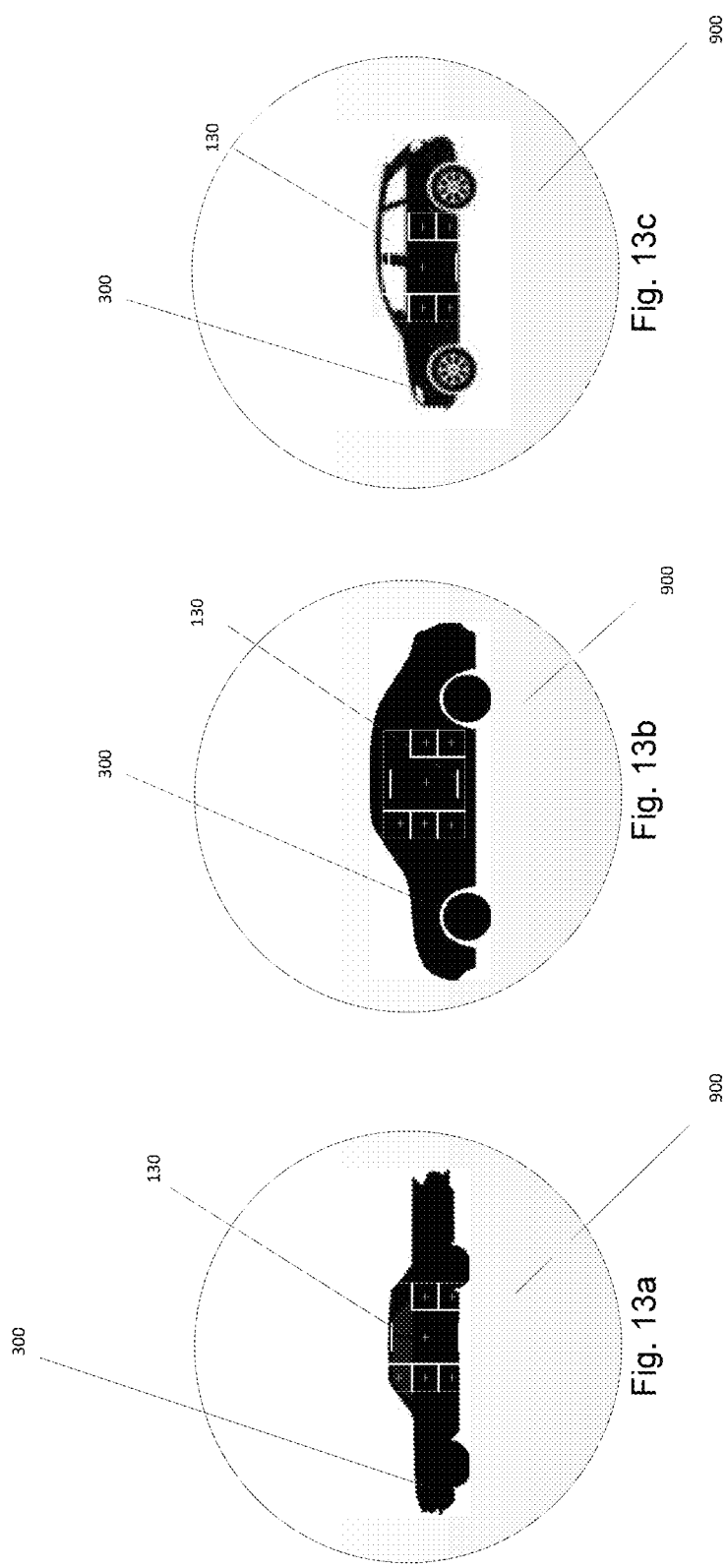

PAYMENT DEVICE WITH HOLOGRAPHIC SECURITY ELEMENT

CROSS REFERENCE TO RELATED APPLICATIONS

This application claims priority to, and the benefit of, U.S. Provisional Patent App. Ser. No. 61/975,106, titled "Payment Device with Holographic Security Element," filed Apr. 4, 2014, the entire content of which is hereby incorporated by reference.

BACKGROUND

Payment devices such as credit cards and debit cards have a limited amount of space, or real estate, for relevant information to be displayed. At the same time, there is a need for some space on the card to be dedicated to security measures, such as a security chip. Security chips have contacts that may be required to be in predetermined places on the card such that when the card is place in a reader, the contacts will be in communication with contacts in the reader. These security measures are becoming more and more important over time as fraud continues to be a problem. Thus, it would be useful for some of the space on a card to serve dual purposes, such as security and for brand awareness.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

An object that enables electronic commerce is disclosed where the object has a holographic image on security contacts. The contacts may be in communication with a security element that provides security features. The contacts may be placed in predetermined locations but may be extended to create an identifiable image. In addition, in some embodiments, the object may have an orifice or opening in the shape of an identifiable image. A transaction element may be placed within the orifice. The transaction element may have a plurality of security contacts that together form a shape that complements the orifice.

BRIEF DESCRIPTION OF THE DRAWINGS

The invention may be better understood by reference to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 2 is a view of a layers of a sample object;

FIGS. 7a-7c are layers of an object with an orifice in the shape of an identifiable image;

FIG. 8 is an illustration of combining an identifiable image and security contacts to form security contacts in an identifiable image;

FIG. 10a illustrates a rectangular orifice;

FIG. 10b illustrates an orifices in an identifiable image shape;

FIGS. 13a-13c are illustrations of combining an identifiable image and security contacts to form security contacts in an identifiable image with a hologram being visible on the security contacts.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

Figure 1:
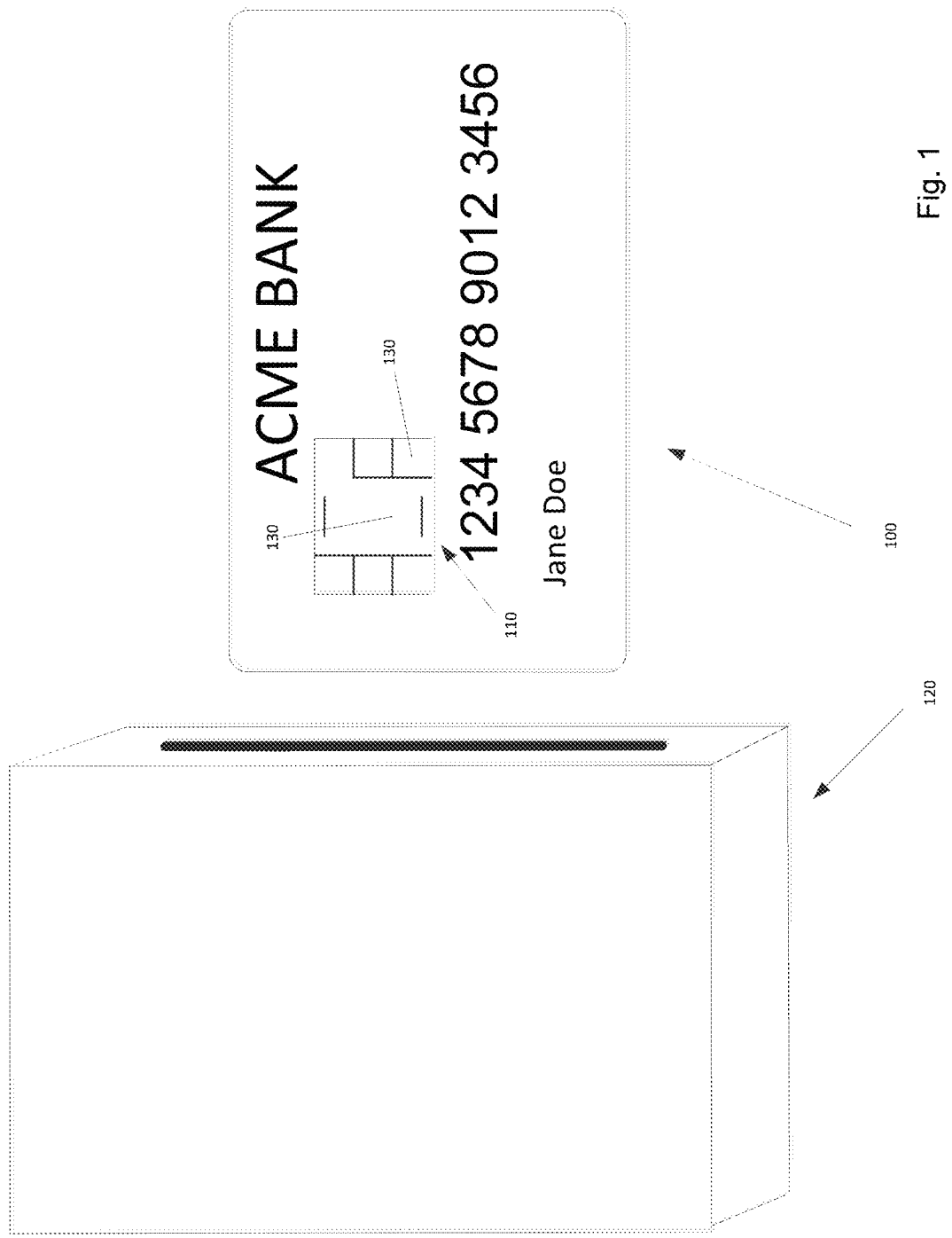
FIG. 1 is an overhead view of a sample object and a reader.

FIG. 1 may illustrate an object 100 for enabling electronic commerce. Examples and not limitations of the object 100 may include credit cards, debit cards or other cards such as driver's licenses, library cards, etc. The object 100 may be any object that has a transaction element 110 which may be a device to provide security. At a high level, the shape of the object 100 may be many and varied so long as the necessary communication between security contacts 130 and a card reader 120 may be accomplished with a minimum amount of undesired adjustments such that the security contacts 130 on the object 100 and the card reader 120 may communicate promptly to facilitate a transaction.

Security measures are becoming more and more important over time as fraud continues to be a problem. A transaction element 110 on transaction objects 100 such as credit cards and debit cards may have security contacts 130 that may have to be in predetermined locations on the object 100 such that when the object 100 is placed in a reader 120, the contacts 130 will be aligned with, and thus may communicate with, contacts in the reader 120. While the location of the transaction element 110 may vary, it may be useful to have the transaction element 110 and security contacts 130 in a consistent and known place on the object 100 so that communication may be easily established in a consistent and routine manner. Once in contact with a card reader 120, the transaction element 110 may communicate with the reader 120 and a security element 230 (FIG. 2) in the object 100 to verify that the object 100 was properly issued and is not a fake.

The shape of the object 100 may vary but there may be guidelines that limit the creativity of the shape of the object 100. As an example, the object 100 may be configured to fit into traditional card readers 120 that have restrictions on the size and shape of the object 100. For example, many card readers 120 may require at least part of the object 100 to be of a predetermined thickness to fit in or even through a card reader 120.

As illustrated in FIG. 2, in an exaggerated view, an object 100 may be made up of a plurality of layers 200-220. If the object 100 is too thick, it will not fit into the card reader 120. Similarly, the width and length of the object 100 may be subject to card reader 120 limits which may be based on agreed upon standards. Similarly, if the object 100 is too wide, it may not work with traditional card readers 120 with security card readers. The object 100 may be of a shape such that it may easily and reliably fit into a card reader 120 and the transaction element 110 may consistently and reliably be in communication with the card reader 120. Logically, if an object 100 is too small, it may not be a tight fit in the card reader 120 and the security contacts 130 may not consistently and reliably make contact with the card reader 120.

Further, the object 100 may be of a size and shape that is convenient for a user to carry. Many wallets, phone cases, purses, etc., have dedicated spaces to hold transaction objects 100 like credit cards. It may be helpful and more acceptable if the object 100 fits in such traditional spaces. At the same time, innovative shapes may also work. In some embodiments, the innovative shapes may operate with existing card readers 120 with security readers and in other embodiments, the card readers 120 may be modified to accept objects 100 with different shapes and different arrangements of security contacts 130. As an example, an object 100 may be shaped to fit on a keychain and the reader 120 may be designed to accept the keychain object and still make the necessary contact with the security contacts 130.

The object 100 may also be of a size such that advertisements and logos may crowded. For example, some credit cards may accumulate points for a particular purpose, such as airline miles. In such a case, a logo for the airline may be on the card. Similarly, an issuing bank may also desire to have its name on the card. Logically, the card processor may also have their name on the card. Finally, a name or slogan for the card may be on the card. Of course, the card may have the name of the card holder, an expiration date and an account number. There may be a hologram that may be used to verify the object 100 is properly issued. Finally, there may be a transaction element 110 with security contacts 130 in a predetermined location which may be in communication with a security element 230. As a result, the face or first surface of the object 100 may be quite crowded. Thus, it would be useful for some of the space on the object 100 to serve dual purposes, such as security and for brand awareness.

A transaction element 110 may have one of more security contacts 130 that are in communication with a security element 230 that may be contained inside the transaction object 100. Of course, the security element 230 may be separate from the transaction element 110 so long as the security element 230 is in communication with the security contacts 130. The security contacts 130 may be of a material that is conductive such that the security contacts 130 can communicate signals to a card reader 120.

In some embodiments, the security contacts 130 for the security element 230 may have a holographic image 300 on the security contacts 130. Holograms are often included on objects like credit cards as holograms are difficult to produce without special equipment. Therefore, it is more difficult to make a fraudulent card as making a hologram without the special equipment is very difficult. In these embodiments, the security hologram may be applied to the visible surface of the security contacts 130. While there may be non-conductive spaces between and/or around the security contacts 130, the hologram 300 may still be visible on the security contacts 130. In this way, the security of a hologram image 300 is present, the security of the security element 230 is present, and the hologram image 300 may add to the visual impact of the object 100.

Figure 3B:
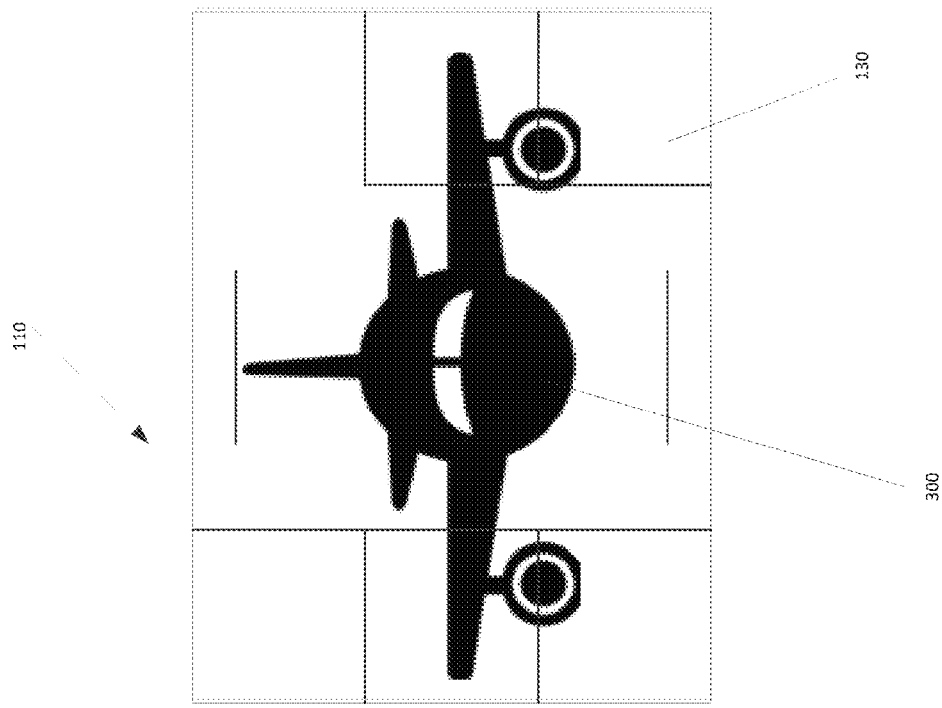
FIGS. 3a-3b are views of security contacts with a hologram as seen from different angles.
Figure 3A:
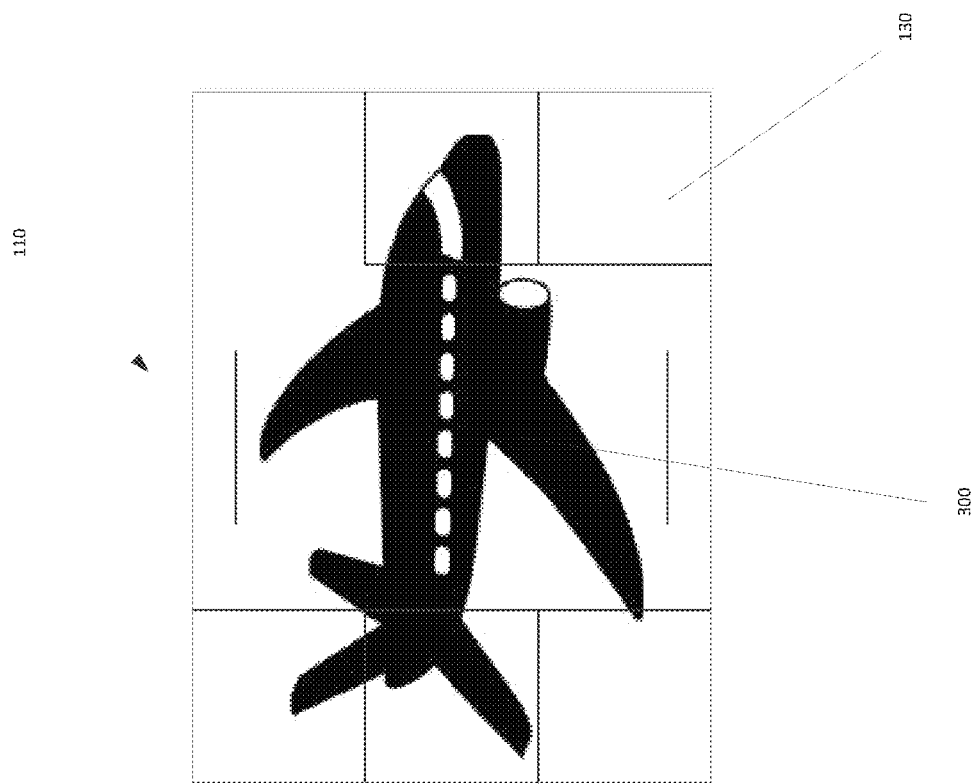
Figure 4C:
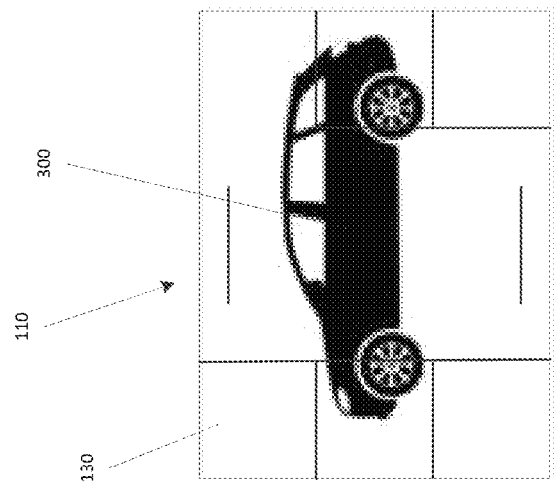
FIGS. 4a-4c are views of security contacts with a hologram as seen from different angles.
Figure 4B:
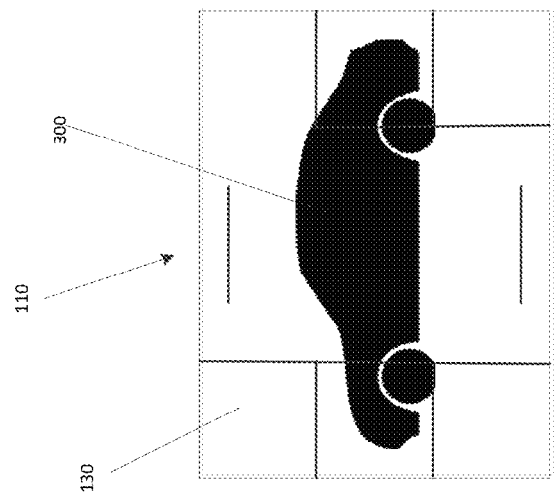
Figure 4A:
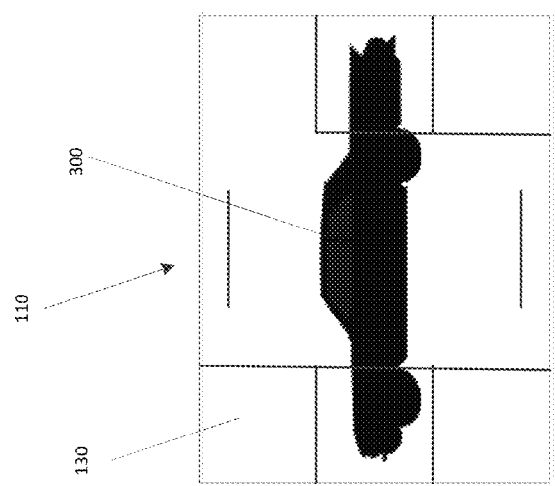
Figure 5A:
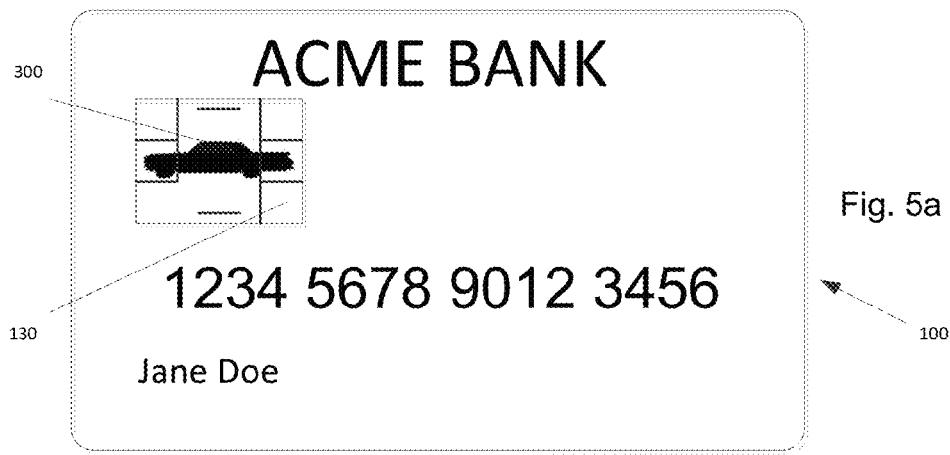
FIGS. 5a-5c are views of objects with security contacts with a hologram as seen from different angles.
Figure 5B:
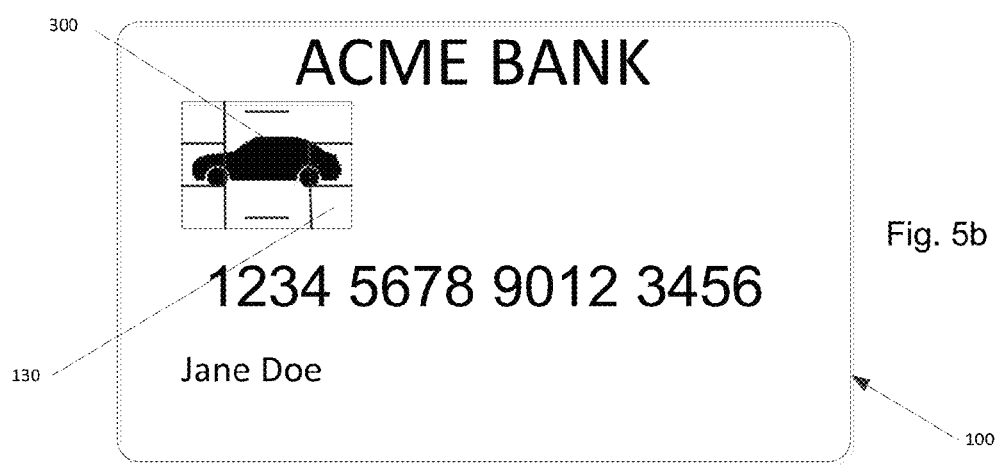
Figure 5C:
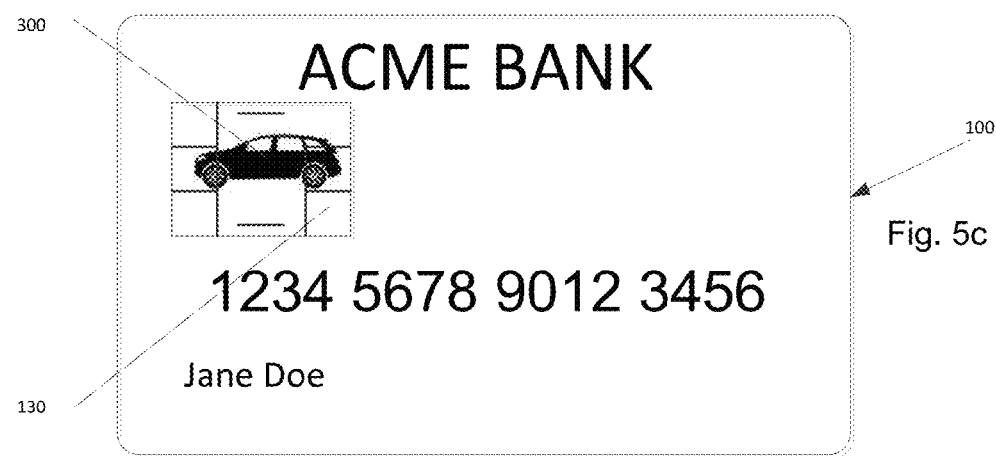
Figure 6A:
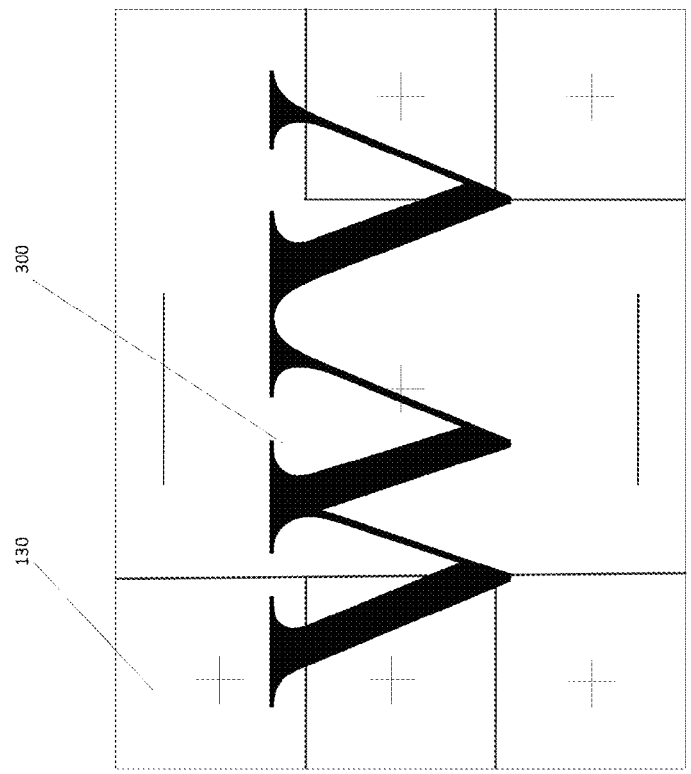
FIGS. 6a-6b are views of security contacts with a hologram of letters as seen from different angles.
Figure 6B:
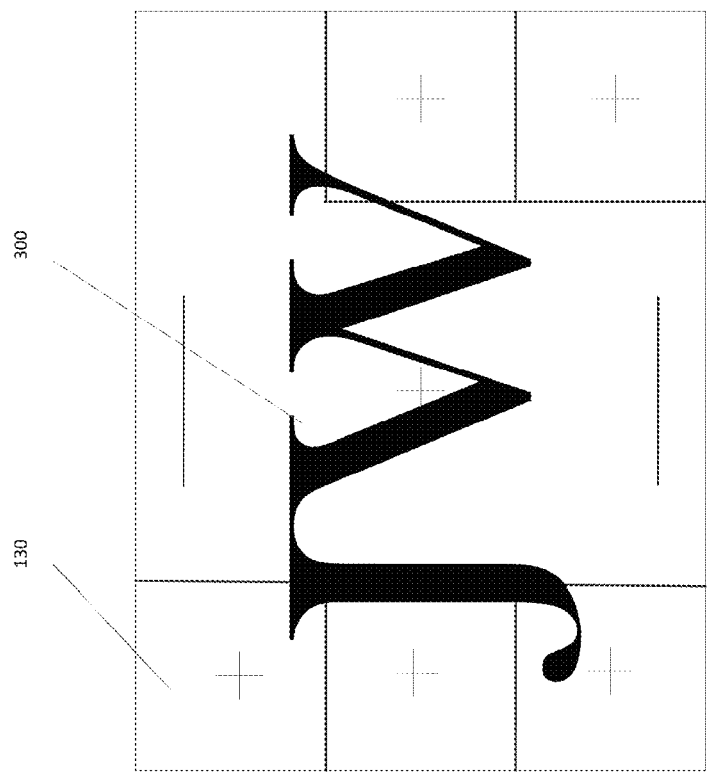

As is known, the image of a hologram 300 may change depending on the viewing angle. For example, in FIG. 3*a*, the hologram 300 may be of a side of an airplane when viewed at a first angle and the image in FIG. 3*b* may be of the front of an airplane when viewed from a second angle. At the same time, the security contacts 130 may continue to communicate with the security element 230 and the card reader 120 while providing a visually interesting appearance. In another embodiment as illustrated in FIGS. 4*a*-4*c*, the hologram 300 may have three images available to be seen as the viewing angle is changed. At a first viewing angle as in FIG. 4*a*, a first car model may be viewed, at a second angle as in FIG. 4*b*, an additional car model may be viewed and at a third angle as in FIG. 4*c*, yet another car model may be viewed. FIGS. 5*a*-5*c* show the hologram 300 on the security contacts 130 as part of the object 100. FIGS. 6*a*-6*b* illustrate an example where letters make up the hologram 300 and the letters change as the view of the hologram 300 changes.

In one embodiment, the hologram 300 may be applied directly to the security contacts 130. In other embodiment, the hologram 300 may be applied to a conductive foil and the conduction foil may be applied with a conductive adhesive to the security contacts 130. In this way, the hologram 300 may be produced with more familiar machinery and the entire security element 230 may not need to be handled to apply the hologram 300. Of course, equipment could be easily modified to apply the hologram 300 directly to the security contacts 130. Holograms made using lasers, chemicals, etchings, embossing, films, masks or any appropriate manner are appropriate and are contemplated.

In an additional embodiment as illustrated in FIGS. 7a-7b, the object 100 may have an orifice 720 in a shape of an identifiable image 700. In some embodiments, the identifiable image 700 may be in the shape of a logo for a corporation. As an example, the identifiable image may be in the shape of a soft drink bottle for a soft drink company. In another embodiment, the identifiable image may be in the shape of a recognizable object like a car for an auto manufacturer or as an airplane for an airline. In other embodiments, the orifice 720 may be in the shape of one or more letters where the letters may be a recognizable, identifiable image 700.

FIGS. 7a-7c may illustrate a sample layered view of the object. In addition, in some embodiments, the orifice 720 may only proceed partially through the object 100 and in other embodiments, the orifice 720 may proceed through the entire object 100. In some embodiments, a first orifice 720 may partially proceed through the object 100 and on the other side, a mirror image of the orifice 720 may proceed partially through the object 100 such that the object 100 may be inserted with either side up and the security contacts 130 will be able to be read by the card reader 120.

The orifices 720 may be created in a variety of ways. In one embodiment, a router type device may be used to route the orifice 720 from the object 100. In another embodiment, the object 100 may be made up of a variety of layers and the orifice 720 may be punched, cut, burned of otherwise be removed from the appropriate layers of the object 100.

In the orifice 720, a transaction element 110 may be placed such as illustrated in FIG. 7b. The transaction element 110 may have a plurality of security contacts 130 that together form a shape that complements the orifice 720. The security contacts 130 may be in communication with a security element 230 that provides security features. The security contacts 130 may be placed in predetermined locations but may be extended to create the complementary identifiable image.

In some embodiments, the transaction element 110 may have a lower layer that is larger than the security contacts 130 which may encompass the security element 230. In this embodiment, the lower layer including the security element 230 may be hidden under an exterior layer of the object and the lower layer may assist in holding the transaction element 110 in place. The transaction element 110 may be placed in the intermediate layer of the object 100 such as in FIG. 7b and an additional layer such as in FIG. 7a may be placed over the inner layer to cover part of the transaction element 110 and hold the transaction element 110 in place. In addition, an adhesive may be used to assist in holding the transaction element 110 in place.

In some other embodiments, the transaction element 110 may be of a similar size to the orifice 720. In such an example, the transaction element 110 may be placed in the orifice 720 and may be held in place using an adhesive or any other appropriate manner.

Figure 9:
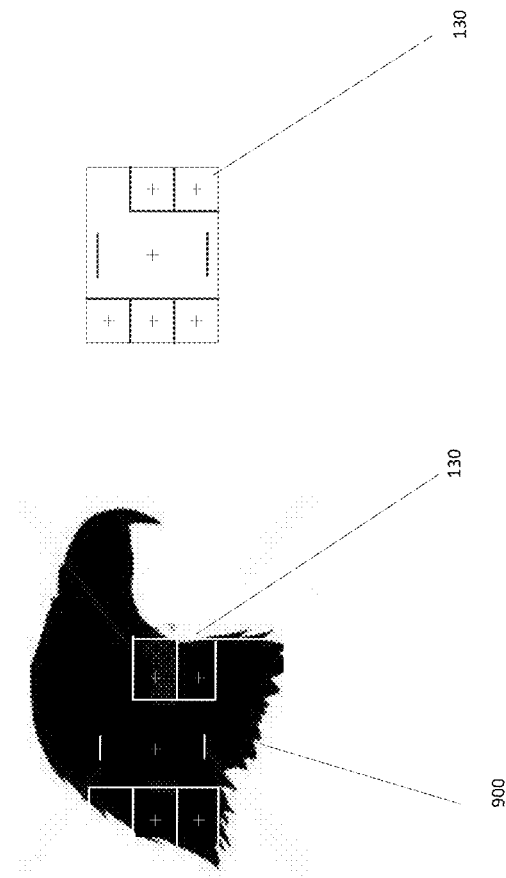
FIG. 9 is an illustration of combining an identifiable image and security contacts to form security contacts in an identifiable image.
Figure 11:
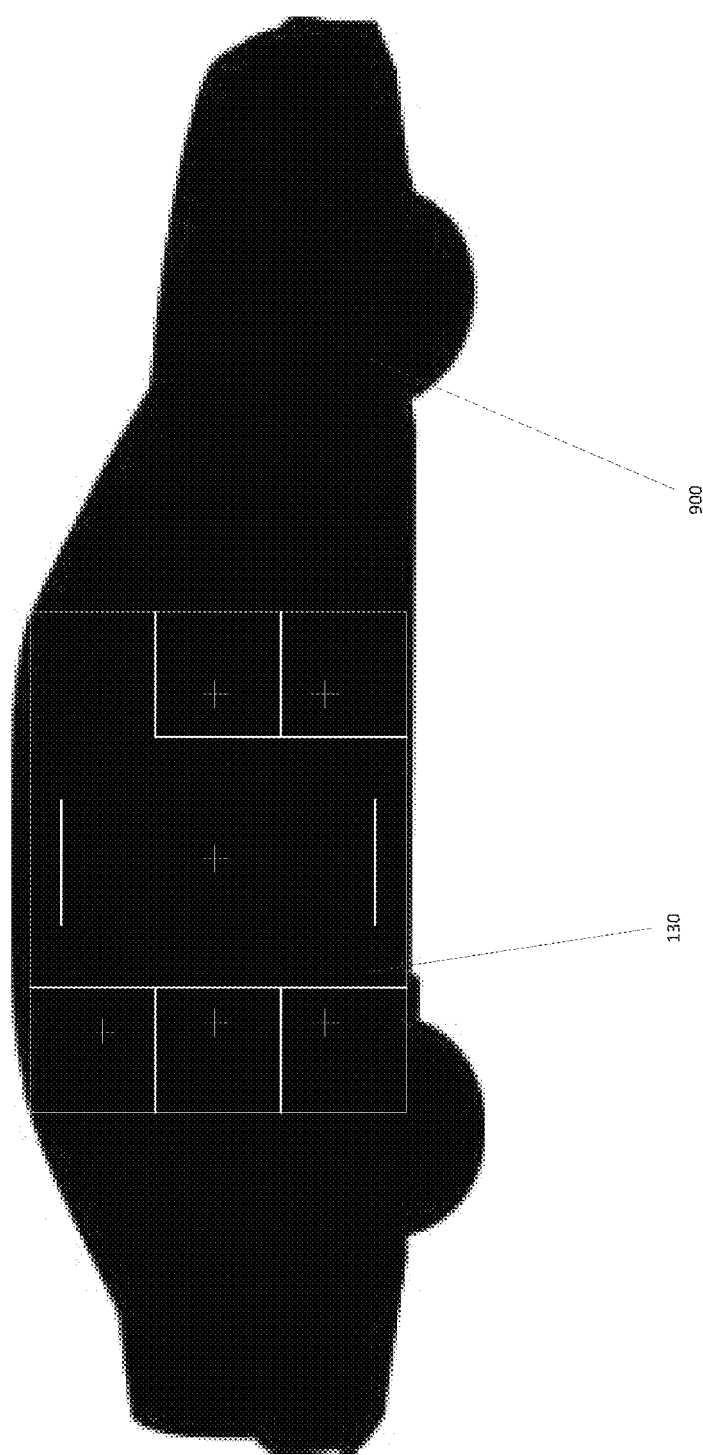
FIG. 11 is an illustration of combining an identifiable image and security contacts to form security contacts in an identifiable image.

As illustrated in FIG. 8, a shape plus the security contact 130 may result in an orifice 720 in the object 100 that can accept security contacts 130 of the complementary shape. FIG. 9 illustrates how the security contacts 130 may be created to create an image of an identifiable image 900. FIG. 10a may illustrate an object 100 with a traditional rectangular orifice 720 for the security contacts 130 and FIG. 10b may illustrate an orifice 720 in the shape of an identifiable image 900 of a bird head for the security contacts 130. FIG. 11 may be another example of creating the security contacts 130 in the shape of an identifiable image 900 of a car.

Figure 12B:
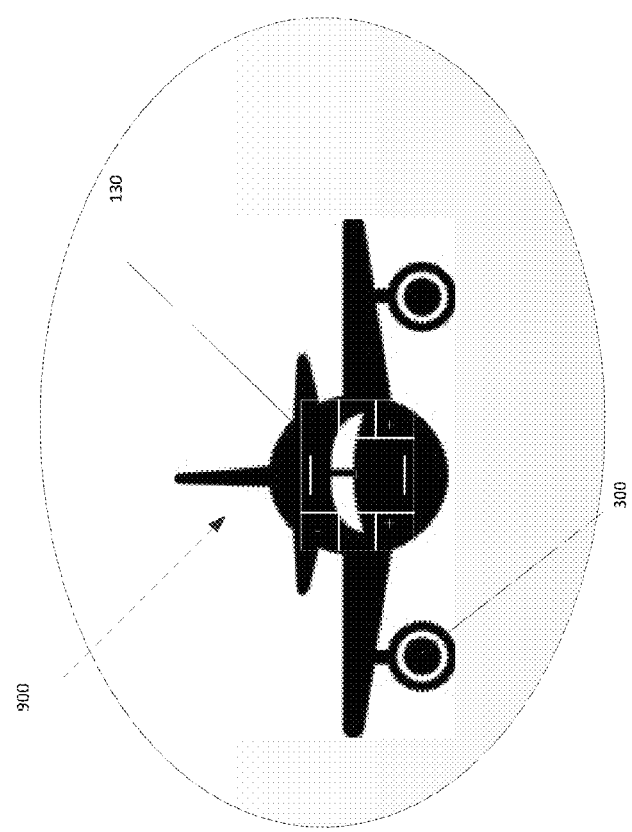
FIGS. 12a-12b are illustrations of combining an identifiable image and security contacts to form security contacts in an identifiable image with a hologram being visible on the security contacts.
Figure 12A:
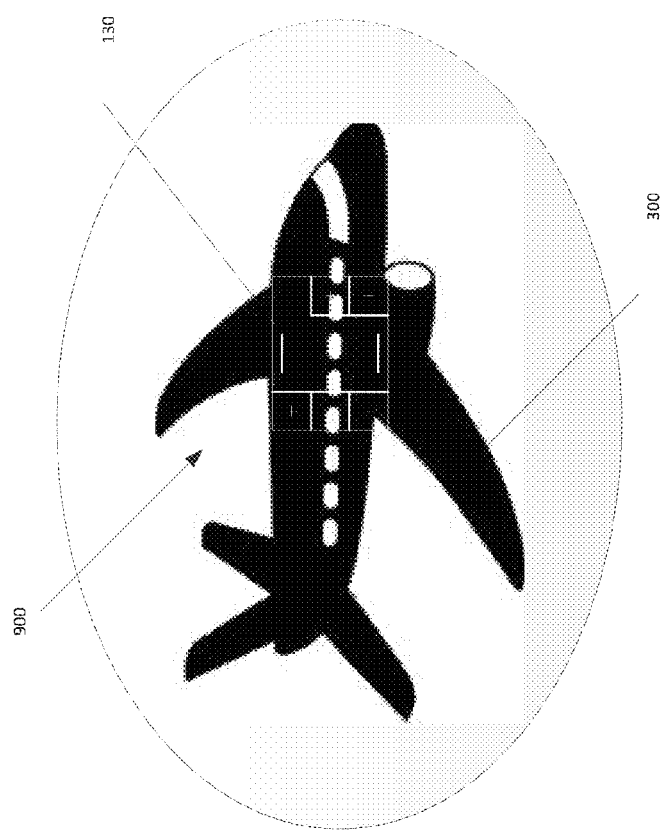

Of course, a hologram 300 may still be applied to some or all of the security contacts 130 when the contacts are in an identifiable image 900. For example, in FIG. 9, an eye of the bird may a hologram and the eye may open and close based on the viewing angle. FIGS. 12a-12b may illustrate an airplane hologram 300 in an oval shape from a first view and from a second view with the security contacts 130 being part of the identifiable image 900. FIGS. 13a-13c may illustrate a series of automobiles as holograms 300 in a round shape on the identifiable image 900 shaped from the security contacts 130.

In shape, the security contact or contacts 130 may together form a complementary shape to the orifice 720. While there may be non-conductive spaces between and/or around the security contacts 130, the overall shape of the contacts 130 may take a shape that is complementary to the orifice 720. The security contacts 130 may communicate to the security element 230 and may allow communication between the card reader 120 and the security element 230 to ensure the object 100 or card has been issued from a non-fraudulent source.

In all the embodiments, the security contacts 130 may be at a level such that the card reader 120 may be capable of communicating with the security contacts 130. At the same time, the security contacts 130 may not protrude to such a point that that security contacts 130 would snag in everyday usage or interfere with traditional card readers 120. In some embodiments, the security contacts 130 may be virtually level with the face of the object 100. In other embodiments, the security contacts 130 may protrude slightly to make communication with the card reader 120 easier. In yet an additional embodiment, the security contacts 130 may be slightly below the level of the face of the object 100. Logically, the various card readers 120 may need to be considered to ensure that effective, reliable and repeatable communication may be enabled between the security contacts 130 and the card reader 120. For example, if common card readers 120 expect slightly raised security contacts 130 and the security contacts 130 are slightly embedded, communication may be unreliable and ineffective.

In addition, physical limitations may have an effect on the height of the security contacts 130. For example, the security element 230 may have a given thickness and users may desire a thin object 100 which may result in the security contacts 130 protruding from the object 100. Logically, if the object 100 is especially thick, the security contacts 130 may be slightly below the surface of the face of the object 100.

The security element 230 may be a variety of technologies. In some embodiments, the security element 230 may be a simple resistor which may return a desired voltage when a known voltage is applied to the resistor. In a more complex embodiment, the security element 230 may include a processor that may operate when power from the card reader 120 is applied to the contacts 130. The processor may then execute a virtually limitless number of operations based on the inputs from the card reader 120.

In addition, in some embodiments, the object 100 may have a mirror image of the security contacts 130 on the second side of the object 100. Logically, the second set of contacts 130 may also be in communication with the security element 230. In this way, the object 100 may be placed into the card reader 120 with either a first side toward the card reader 120 or with a second side toward the card reader 120.

Figure 14:
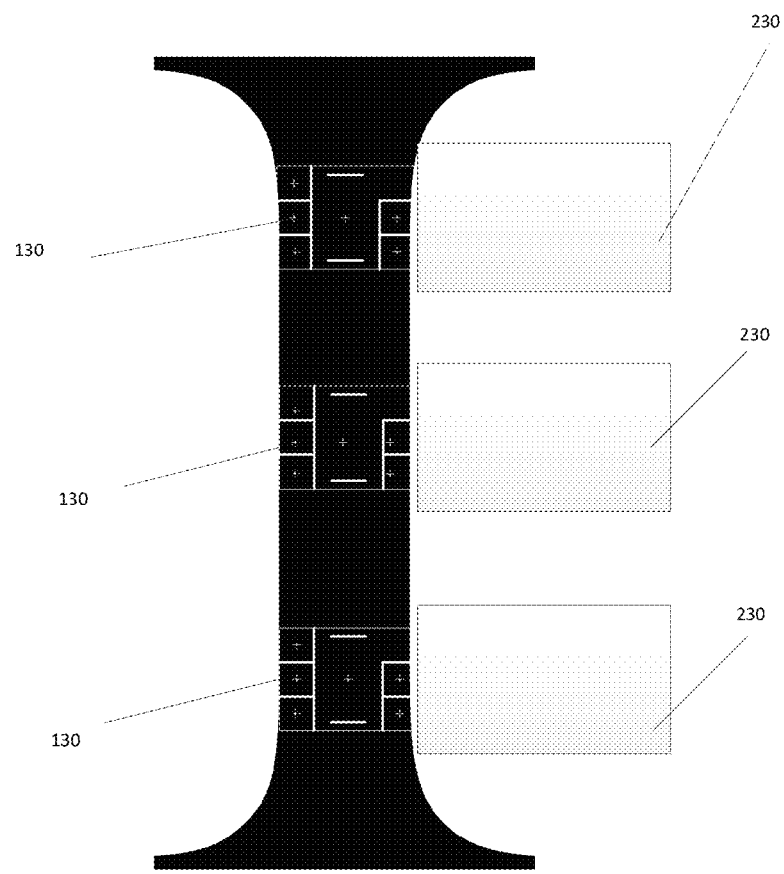
FIG. 14 is an illustration of an identifiable image with multiple sets of security contacts.

In another embodiment, for enhanced security, there may be a plurality of security elements 230 in the object 100 and each may have its own set of security contacts 130. For example, as illustrated in FIG. 14, a first set of contacts 130 may be in communication with a first security element 230 and a second set of contacts 130 may be in communication with a second security element 230. The first security contacts 130 and second security contacts 130 may form a single set of security contacts 130 or the first set of security contacts 130 may be physically separate from the second set of security contacts 130. For example, a first set of contacts 130 may be on the front of the object 100 and a second set of contacts 130 may be on the back of the object 100.

In addition, the second (or even more) security elements 230 may have different purposes. For example, a first security element 230 may be for computing security and a second security element 230 may be for transactional security such as making purchases.

In some embodiments, one or more of the security elements 230 may be programmable by an administrator or person with authority to access the security elements 230. For example, a first security element 230 may be locked and unmodifiable while a second security element 230 may be programmable by an authority.

In embodiments wherein the security element 230 includes a processor, numerous security schemes may be included on a single security element 230. For example, the security element 230 may have an initial interface which may include an application programming interface. Based on the received input, different branches or security may be accessed. In this way a single processor may provide security for a variety of uses.

In some embodiments, the second side of the object 100 (opposite the first security element 230) may be smooth. In some embodiments, a magnetic stripe may be embedded in the second side of the object 100 and the surface may be substantially flat. In other embodiments, the magnetic stripe may cause a slight increase in the surface. Of course, if there are multiple security elements 230 and one is on the second side, the second surface may be substantially smooth but may have an orifice 720 with security contacts 130 which may be at a variety of levels as previously explained.

Of course, the examples and descriptions are to provide guidance to the reader and are not meant to be limiting or exclusive. There are many manners of creating such an object, all of which are contemplated and included.

The invention claimed is:

1. An object for enabling electronic commerce comprising:
   a first surface defining an orifice, wherein a transaction element is contained within the orifice, wherein the transaction element comprises:
   an identifiable shape complementary to the orifice independent from predetermined locations, wherein the identifiable shape comprises a logo or a brand;
   a plurality of contacts in communication with a security element wherein the contacts are in the predetermined locations and wherein a holographic image is visible on a visible section of the plurality of contacts; and
   a second surface opposite the first surface.

2. The object of claim 1, wherein the plurality of contacts together are complementary to the orifice and form the identifiable shape.

3. The object of claim 2, wherein the security element is configured to provide a signal that the object is valid.

4. The object of claim 1, wherein the plurality of contacts are adapted to communicate with a reader.

5. The object of claim 1, wherein the identifiable shape comprises a letter or a good.

6. The object of claim 1, wherein a thickness of the object allows the object to be accessed and read by a reader.

7. The object of claim 1, wherein the second surface is continuous.

8. The object of claim 1, wherein the second surface comprises a magnetic information stripe.

9. The object of claim 1, wherein a width and length of the object allows the object to be accessed and read by a reader.

10. An object for enabling electronic commerce comprising:
    a first surface defining an orifice, wherein a transaction element is situated within the orifice, wherein the transaction element comprises:
    a plurality of contacts which together are complementary to the orifice and are in communication with a security element, the plurality of contacts:
    being at a level adapted to communicate with a reader;
    being positioned at predetermined locations; and
    comprising a visible hologram on a visible surface of the contacts; and
    a second surface opposite the first surface, wherein the transaction element forms an identifiable shape independent from the predetermined locations of the plurality of contacts, wherein the identifiable shape comprises at least one of a logo, a brand, and a letter.

11. The object of claim 10, wherein the transaction element comprises a visible hologram on the first surface of the object.

12. The object of claim 10, wherein a thickness of the object allows the object to be accessed and read by a reader.

13. The object of claim 10, wherein the second surface is continuous.

14. The object of claim 10, wherein the second surface comprises a magnetic information stripe.

15. The object of claim 10, wherein a width and length of the object allows the object to be accessed and read by a reader.

16. The object of claim 10, wherein the security element is configured to provide a signal that the object is valid.

17. An object for enabling electronic commerce comprising:
    a first surface defining an orifice, wherein a transaction element is contained within the orifice, wherein the transaction element comprises:
    an identifiable shape complementary to the orifice independent from predetermined locations, wherein the identifiable shape comprises a letter or a good;
    a plurality of contacts in communication with a security element wherein the contacts are in the predetermined locations and wherein a holographic image is visible on a visible section of the plurality of contacts; and
    a second surface opposite the first surface.

18. The object of claim 17, wherein the identifiable shape comprises a logo or a brand.

19. The object of claim 17, wherein the plurality of contacts together are complementary to the orifice and form the identifiable shape.

20. The object of claim 19, wherein the security element is configured to provide a signal that the object is valid.

* * * * *